United States Patent [19]

Kitamura

[11] Patent Number: 4,629,822
[45] Date of Patent: Dec. 16, 1986

[54] ELECTRICAL BUSHING

[75] Inventor: Yukio Kitamura, Amagasaki, Japan

[73] Assignee: Mitsubishi Denki Kabushiki Kaisha, Tokyo, Japan

[21] Appl. No.: 841,263

[22] Filed: Mar. 19, 1986

[30] Foreign Application Priority Data

Mar. 27, 1985 [JP] Japan .............................. 60-46289[U]

[51] Int. Cl.$^4$ ............................................ H01B 17/26
[52] U.S. Cl. ............................................. 174/12 BH
[58] Field of Search ........................ 174/12 BH, 75 F

[56] References Cited

FOREIGN PATENT DOCUMENTS 54-111697 9/1979 Japan .............................. 174/12 BH Primary Examiner—Laramie E. Askin
Attorney, Agent, or Firm—Leydig, Voit & Mayer

[57] ABSTRACT

An electrical bushing comprises a central conductor supported at the opposite ends of a hollow insulating tube, one end of the central conductor being axially movable relative to the insulating tube. A stationary terminal element is secured and electrically connected to the movable end of the central conductor, and a movable terminal is disposed axially movable relative to the stationary terminal element. An expansion chamber housing with a terminal cap for defining therein an expansion chamber is hermetically attached to the insulating tube to enclose the movable end of the conductor. A flexible conductor is used for electrically connecting the stationary terminal element and the movable terminal element while allowing an axial movement therebetween, and a compression spring axially biases the movable terminal element against the terminal cap to establish an electrical contact therebetween.

3 Claims, 3 Drawing Figures

ELECTRICAL BUSHING

BACKGROUND OF THE INVENTION

This invention relates to an electrical bushing and more particularly to improvements in tip construction for an electrical bushing that is used at the lead portion of an electrical device.

FIG. 1 shows a sectional view of a tip portion of a conventional bushing for high voltage use and used as the lead portion of an electrical device. This is a so-called center clamping type oil-filled bushing that generally utilizes the central conductor as a clamping member. In the drawing, this conventional bushing comprises a hollow insulating tube 1, a central conductor 2 extending through the tube and a resilient member 3 supplying a compressive force to the tube 1 and which in this figure is a spring concentrically disposed around and insulated from the conductor 2. The load from the resilient member is received by a step 4. Further, the bushing comprises a terminal fitting 5 fixing the step 4 to the central conductor 2, insulating oil 6 sealed within the bushing, an expansion chamber housing 7 which absorbs expansion and contraction of the insulating oil and alleviates changes in the inner pressure, a terminal cap 8 fixed to the expansion chamber housing 7, flexible conductor 9 one end of which is connected to the terminal fitting 5 and the other end thereof being connected to the terminal cap 8 in order to conduct current of the central conductor outside of the bushing. Furthermore, the bushing comprises a bottom plate 10 which is disposed between the resilient member 3 and the hollow insulating tube 1 for fixedly holding the electrically insulating expansion chamber housing 7 which is bolted thereto, an inert sealing gas filled within the expansion chamber housing 7 and a gasket 12 for maintaining a seal between the expansion chamber housing 7 and the terminal cap 8.

The operation of such conventional apparatus will hereinafter be explained. Due to changes in external temperatures and in the current flowing in the central conductor 2, temperature changes occur in the central conductor 2 and the hollow insulating tube 1 disposed surrounding the conductor 2, resulting in the expansion and contraction thereof. However, since the central conductor 2 has a coefficient of thermal expansion different from the hollow insulating tube, it contracts and expands in relation to the hollow insulating tube 2. Therefore, the flexible cnductor 9 is used to absorb the displacement between the expansion chamber housing 7 which is fixedly held by the bottom plate 10 press fit against the hollow insulating tube 1 by the resilient member 3 and also to conduct current outside of the housing 7. This flexible conductor 9 has one end connected to the terminal fitting 5 mounted to the central conductor 2 and the other end attached to the terminal cap 8. This is done by pulling the flexible conductor 9 out through an opening in the expansion chamber housing 7 used for mounting cap 8, securing the one end to cap 8, and then mounting the terminal cap 8 to the housing 7 using a gasket 12.

FIG. 2 is a cross sectional view of another example of a bushing. In the drawing, the same numerals are used to represent the same or corresponding portions as in FIG. 1. The bushing comprises a terminal spindle 13 screwed into the central conductor 2 and a stopper 14 for transmitting the load of the resilient member 3 through the step 4 to the terminal spindle 13. A terminal cap 8 is fixed such as by welding to the expansion chamber housing 7 and a movable terminal 15 is fixed to the terminal spindle 13 and presses against the side of the terminal cap 8 to connect therewith. In conventional bushings of this type, the above elements can be assembled before the expansion chamber housing 7 is mounted; and when the housing 7 is finally fixed, the terminal cap 8 and the movable terminal 15 are electrically connected to each other, which is an extremely good feature in terms of assembly. However, both of these examples have respective inherent problems.

In the former example shown in FIG. 1, the weight of the flexible conductor 9 becomes heavier for large currents, thus deteriorating performance. Further, since a good seal is required from the gasket 12 between the terminal cap 8 and the housing 7 and since analysis of the inner insulating oil and measurement of the inner pressure are generally not carried out during periodic maintenance checks while the bushing is in use, a bad seal resulting from degeneration of the gasket 12 is generally not discovered until damage has taken place. In the worst case, the penetration of rain water and the resulting deterioration of the insulating oil 6 can lead to a serious accident such as dielectric breakdown.

The problem with the latter example shown in FIG. 2 is that due to the expansion/contraction of the central conductor 2, there is a fear of metallic powder being generated from the resulting rubbing between the movable terminals 15 and the terminal cap 8, such powder mixing into the insulating oil possibly leading to a significant dielectric breakdown accident.

SUMMARY OF THE INVENTION

An object of the present invention is to provide an electrical bushing free from the above-discussed drawbacks of the conventional bushing.

Another object of the present invention is to provide an electrical bushing having a simple structure.

Still another object of the present invention is to provide a reliable electrical bushing which can be easily assembled.

With the above objects in view, the electrical bushing of the present invention comprises a hollow electrically insulating tube, and a central conductor extending through the hollow insulating tube and supported at the opposite ends of the insulating tube, at least one end of the central conductor being axially movable relative to the insulating tube. A stationary terminal element is secured in proximity to and electrically connected with the movable end of the central conductor, and a movable terminal is disposed axially movable relative to the stationary terminal element. An expansion chamber housing for defining therein an expansion chamber is hermetically attached to the insulating tube at the end thereof corresponding to the movable end of the central conductor to enclose the movable end of the conductor. An electrically conductive terminal cap is hermetically secured to and extends through the expansion chamber housing, the terminal cap being axially aligned with the central conductor. Resilient connecting means is used for electrically connecting the stationary terminal element to the movable terminal element while allowing an axial movement of the movable terminal element relative to the stationary terminal element. The connecting means also axially biases the movable terminal element against the terminal cap to establish an electrical contact therebetween.

PREFERRED EMBODIMENT OF THE INVENTION

Figure 1:
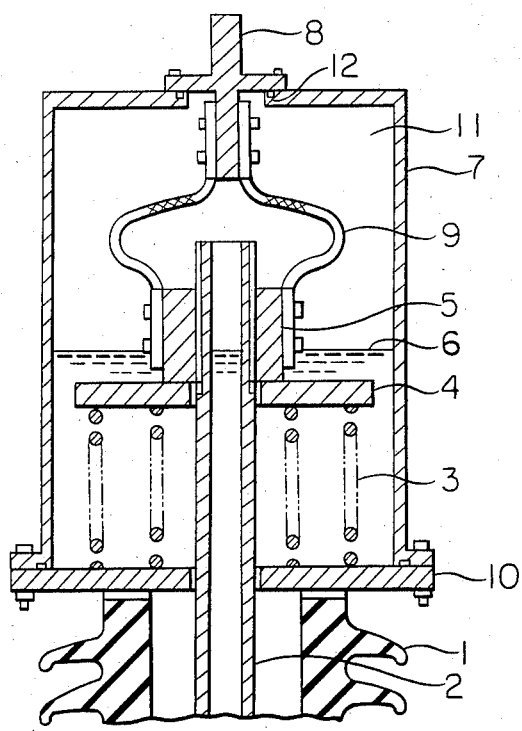
FIG. 1 is a cross sectional view showing a tip construction for a conventional center clamping type bushing.
Figure 2:
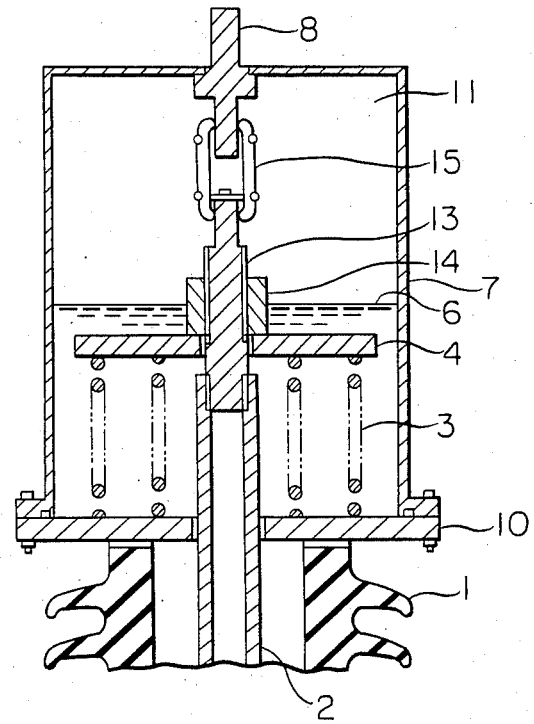
FIG. 2 is a cross sectional view showing a tip construction for a bushing according to an another example of a conventional center clamping type bushing.
Figure 3:
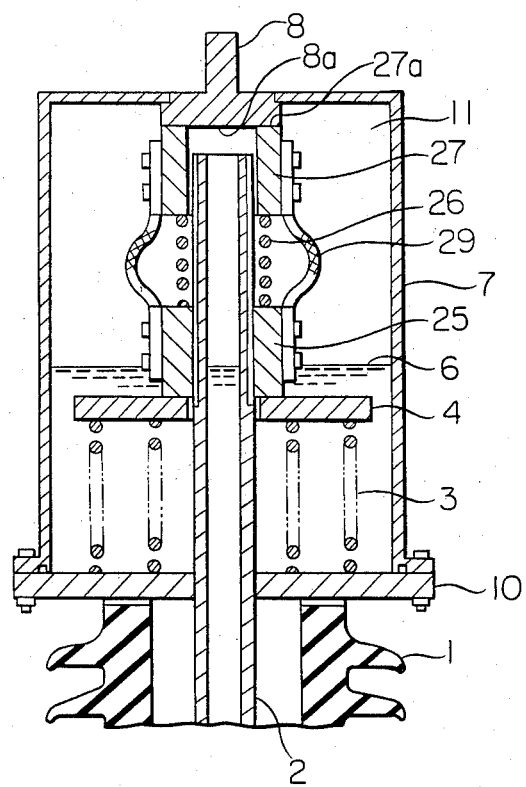
FIG. 3 is a cross sectional view showing a tip construction for a bushing according to an embodiment of a center clamping type bushing of this invention.

In FIG. 3, the same symbols as those of FIG. 1 denote the same or corresponding portions. A terminal cap 8 is integrally fixed, for example by welding, to an expansion chamber housing 7 from the inside thereof. A first terminal fitting 25 is screwed onto a central conductor 2. Within the housing 7 there is disposed a flexible conductor 29 one end of which is connected to a first terminal fitting 25 and the other end of which is connected to a second terminal fitting 27. Between the first terminal fitting 25 and the second terminal fitting 27 there is disposed a resilient member 26. An end surface 27a of the second terminal fitting 27 is urged by the resilient member 26 upon the inner surface 8a of the terminal cap 8 that is integrally fixed to the housing 7 to be electrically connected with each other. Namely, in this embodiment, the electrically conductive resilient member is comprised of the flexible conductor 29 and the resilient member 26.

That is, in the bushing of this invention, the housing 7 thereof is firmly bolted to the bottom plate 10. This causes the resilient member 26 to urge the second terminal fitting 27 upon the terminal cap 8 that is integrally fixed with the housing 7. Accordingly, a predetermined contact pressure can be achieved between the terminal cap 8 and the second terminal fitting 27 by compressed repulsive force. Additionally, even if the central conductor 2 contracts due to changes in external temperature or in the conducting current, this resilient member 26 can absorb the change and a contact pressure greater than a predetermined value can be permanently maintained between the terminal cap 8 and the second terminal fitting 27. Also, the repulsive force of the first resilient member 3 used for obtaining the center clamping force of the bushing is considerably larger than that of the second elastic member 26, so that there is very little effect on the compressed repulsive force of resilient member 3 clamping the hollow insulating tube 1 and the like resulting from the compressed repulsive force of the resilient member 26.

Still, even though in the above embodiment the bottom step 4 and the first terminal fitting 25, the second terminal fitting 27 and the terminal cap 8, are separately formed respectively, they may also be integrally formed. This can also be said with regard to the relationship between the second terminal fitting 27 and the terminal cap 8.

In the drawing of this embodiment, a resilient member 26 is provided between the first terminal fitting 25 and the second fitting 27, but if something having a compressive and resilient force in addition to the characteristics of the flexible conductor 29 were to be used, then the resilient member 26 may be omitted.

What is claimed is:

1. An electrical bushing comprising;
   a hollow electrically insulating tube;
   a central conductor extending through said hollow insulating tube and supported at opposite ends of said insulating tube, at least one end of said central conductor being axially movable relative to said insulating tube;
   a stationary terminal element secured to and electrically connected to the movable end of said central conductor;
   a movable terminal element axially movable relative to said stationary terminal element;
   an expansion chamber housing for defining therein an expansion chamber, said expansion chamber housing being hermetically attached to said insulating tube at the end thereof corresponding to the movable end of said central conductor to enclose the movable end of the conductor;
   an electrically conductive terminal cap hermetically secured to and extending through said expansion chamber housing, said terminal cap being axially aligned with said central conductor; and
   resilient connecting means for electrically connecting said stationary terminal element to said movable terminal element while allowing an axial movement of said movable terminal element relative to said stationary terminal element and for axially biasing said movable terminal element against said terminal cap to establish an electrical contact therebetween.

2. An electrical bushing as claimed in claim 1, wherein said resilient connecting means comprises a flexible conductor and a compression spring.

3. An electrical bushing as claimed in claim 1, wherein said resilient connecting means comprises an electrically conductive spring.

* * * * *